(12) United States Patent
Flatley

(10) Patent No.: US 9,586,716 B2
(45) Date of Patent: Mar. 7, 2017

(54) CARRYING HANDLE

(71) Applicant: Matthew Flatley, Alstonville (AU)

(72) Inventor: Matthew Flatley, Alstonville (AU)

( * ) Notice: Subject to any disclaimer, the term of this patent is extended or adjusted under 35 U.S.C. 154(b) by 0 days.

(21) Appl. No.: 15/199,074

(22) Filed: Jun. 30, 2016

(65) Prior Publication Data

US 2017/0008661 A1    Jan. 12, 2017

(30) Foreign Application Priority Data

Jul. 9, 2015    (AU) ................................. 2015203850

(51) Int. Cl.
*B65D 5/46* (2006.01)
*A45F 5/10* (2006.01)
*B65D 5/42* (2006.01)
*A47J 47/14* (2006.01)

(52) U.S. Cl.
CPC ............ *B65D 5/46008* (2013.01); *A45F 5/10* (2013.01); *A47J 47/145* (2013.01); *B65D 5/4266* (2013.01); *A45F 2005/1013* (2013.01)

(58) Field of Classification Search
None
See application file for complete search history.

(56) References Cited

U.S. PATENT DOCUMENTS

| | | | | | |
|---|---|---|---|---|---|
| 2,532,306 | A | * | 12/1950 | Herbert | A45F 5/12 294/150 |
| 3,623,633 | A | * | 11/1971 | Kinn | B65D 25/2876 215/398 |
| 3,865,292 | A | * | 2/1975 | Foley | B65D 63/18 294/149 |
| 4,140,257 | A | * | 2/1979 | Peterson | B65D 63/18 206/804 |
| 4,396,128 | A | * | 8/1983 | Larson | A45F 5/10 215/399 |
| 4,684,163 | A | * | 8/1987 | Anderson | A45F 3/14 294/149 |

(Continued)

FOREIGN PATENT DOCUMENTS

| DE | 20308891 U1 | 9/2003 |
|---|---|---|
| FR | 1368117 A | 7/1964 |

(Continued)

OTHER PUBLICATIONS

Patent Examination Report No. 1 of Australian Patent Application No. 2015203850, filed Jul. 9, 2015, issued by the Australian Government Intellectual Property Office and dated Aug. 19, 2015.

*Primary Examiner* — Gary Elkins
(74) *Attorney, Agent, or Firm* — Sorell, Lenna & Schmidt, LLP

(57) ABSTRACT

A carry handle (33) for carrying a pizza box or cake box or other boxed food product is made of inexpensive disposable paper or cardboard and comprises a pair of strap portions which generally are parallel to each other and in a side-by-side relationship and are joined to each other by a fold line (17). The strap portions can be twisted about the fold line (17) into a cross like configuration. A pizza box can then be placed on the cross like configuration. The strap portions are longer than the width of the pizza box and can therefore be lifted up and over the pizza box and connected together to form a reliable carry handle.

12 Claims, 7 Drawing Sheets

(56) References Cited

U.S. PATENT DOCUMENTS

| | | | | |
|---|---|---|---|---|
| 4,763,833 | A | * 8/1988 | Stoll | B65D 5/2047 217/125 |
| 4,784,265 | A | 11/1988 | Gitlitz et al. | |
| 5,503,448 | A | * 4/1996 | Dewey | B65G 7/12 294/152 |
| 5,647,483 | A | * 7/1997 | Harris | B65D 71/36 206/427 |
| 6,033,000 | A | * 3/2000 | Sandeen | A45F 5/10 294/149 |
| 7,464,975 | B1 | * 12/2008 | Cox | A45C 11/24 294/138 |
| 2009/0200347 | A1 | * 8/2009 | Edralin | A45C 13/28 224/250 |
| 2012/0125797 | A1 | 5/2012 | Foye et al. | |
| 2014/0231494 | A1 | * 8/2014 | Yang | B65D 5/2047 229/108 |
| 2015/0030262 | A1 | * 1/2015 | Van Den Berg | B65D 33/105 383/29 |
| 2015/0144670 | A1 | * 5/2015 | Millington | A45C 13/30 224/250 |
| 2015/0150398 | A1 | * 6/2015 | Bateman | A47G 23/0216 294/137 |

FOREIGN PATENT DOCUMENTS

| | | |
|---|---|---|
| FR | 2843584 A1 | 2/2004 |
| GB | 2316861 A | 3/1998 |
| GB | 2425048 A | 10/2006 |

\* cited by examiner

CARRYING HANDLE

CROSS REFERENCE TO RELATED APPLICATION

This application takes priority from and claims the benefit of Australian Patent Application No. 2015203850 filed Jul. 9, 2015, the disclosure of which is hereby incorporated by reference.

TECHNICAL FIELD

The present invention is directed to a carrying handle and especially to an inexpensive single use strap-like handle for carrying boxed food items such as pizzas and cakes.

BACKGROUND

Any references to methods, apparatus or documents of the prior art are not to be taken as constituting any evidence or admission that they formed, or form part of the common general knowledge.

Carrying purchased, take away, boxed food items such as pizzas can present problems. The pizza box is quite large in length and width but quite small in height. The boxes are manufactured as inexpensively as possible to keep the cost of the boxed pizza as low as possible. Thus it is not uncommon for the pizza containing box to sag which can cause the pizza to fall out of the box, or the box be dropped. A hot pizza can cause the bottom of the box to become too hot to hold. Hot fat or cheese can ooze from the box and onto a person's hands causing burns.

The problem is exacerbated when multiple boxes need to be carried from the pizza outlet. The boxes are typically stacked on top of each other and held in a manner that is likely to cause burns to hands, wrists and arms when carried.

It is known to manufacture a pizza box having a built in handle on the top of the box. This does not overcome sagging of the bottom of the box. To do so, the box is made of thicker stronger material which adds to the cost of the box and therefore the pizza. The arrangement does not allow for multiple boxes to be stacked on top of each other while still being carried.

It is known to provide a paper or similar band to hold bundled items together. An example is the paper strap holding face towels in a bundle as would be found in the bathrooms of some hotels. Such bands are not designed to hold heavier objects and are not designed to enable the objects to be carried by the band. Instead any carrying still requires the towels or other objects to be held as the band does nothing more than to stop the towels from falling off each other. These bands/straps are more commonly known as an "organizing strap" as opposed to a carrying handle.

It is known to provide a strap like handle which is attached to opposite edges of a pizza box. This handle provides no support for the box bottom which can easily sag. The box cannot be opened to inspect the pizza once the handle is attached, so the handle needs to be attached after the purchaser has handled the hot pizza box to inspect the contents prior to purchase. US patent 2011/0049922 describes such a handle.

Another carry handle comprises handle portions that need to be firmly gripped essentially to hold the handle to the box. This may prove too difficult for children and the elderly. The handle is a flexible cloth like arrangement which is not easy to store in a dispenser as it would more likely tangle with other handles in the dispenser. The carry handle is therefore typically owned by the pizza purchaser and is reusable and washable. U.S. Pat. No. 8,579,344 describes such a carry handle.

U.S. Pat. No. 7,841,635 similarly describes an expensive quick release strap assembly for bags and packages. The assembly has metal clips and strong webbing straps and would be totally unsuited as a disposable pizza box carry handle.

DE 20308891U describes a large pizza box carrier which has a large square base and extending straps. Such a device is large and unsuited for compact initial storage (for instance on a counter top at the pizza outlet). The carrier has no easy to hold looped handle portion. The size of the carrier unnecessarily adds to the cost of the pizza. A much smaller reliable mass producible and inexpensive carrier would be much more suited.

Other types of handles for carrying fragile objects comprise multiple separate bands or straps which must be placed about the object in a particular manner. Clearly, there is a disadvantage in having a carry handle of separate parts as these need to be stored separately and then assembled about the object. If the object is a hot pizza box, the multi-step assembly can expose a person to burns. There would be an advantage to provide a carry handle made of a single piece. U.S. Pat. No. 4,784,265 describes a multi-part carry handle.

Another disadvantage with carrying boxed food items such as pizzas, cakes and the like is that the purchase often includes other items such as drinks, garlic bread and the like. Carrying these with the boxed food item can be difficult and can cause items to be dropped.

Another disadvantage is that the purchaser of such boxed food items is usually already carrying personal items such as car/house keys, mobile phone etc. These items can be dropped and damaged when attempting to carry boxes of pizzas, drinks, deserts, cakes and the like.

The pizza outlet may also be liable if a customer is scalded by hot fat or liquid oozing from the box.

Of course, the purchaser can be highly organized and arrive with a bag or carry box to hold the various items, but in practice this does not happen very often.

Thus, there seems to be currently no product on the market which allows consumers of pizzas or cakes to carrying the boxes in a safe manner and preferably in one hand to enable the other hand to hold car keys, a mobile phone, a child's hand and the like.

It is an object of the present invention to provide a carry handle that may overcome at least one of the above disadvantages or provide a useful or commercial choice in the marketplace.

SUMMARY OF THE INVENTION

According to a first aspect of the present invention there is provided a carry handle for a boxed food item, the handle comprising an elongate strap having:
a first strap portion;
a second strap portion;
a first fold line attaching the strap portions together the first fold line being entirely on one of the strap portions and extending from one longitudinal edge of the strap portion and diagonally to a point spaced inwardly from the other longitudinal edge of the strap portion;
wherein the strap portions are foldable about the first fold line between a non-use position where the strap portions are generally parallel to each other and a carrying position where the strap portions are angled to each other.

A non-limiting embodiment of the carry handle in the non-use position is illustrated in FIGS. 1 and 5, and in the carrying position is illustrated in FIGS. 6 and 7 at least. In the non-limiting embodiment, the first strap portion has reference numerals 10 and 11, the second strap portion has reference numerals 12 and 13, and the first fold line has reference numeral 17. The carry handle can have additional fold and cut lines that will be described below.

The carry handle may comprise a disposable or single use strap.

The strap may be manufactured from environmentally friendly paper or cardboard. The paper may be treated to provide a degree of strength when wet. The paper may be may be waxed or otherwise coated. The paper may contain fillers. Similarly, the cardboard may be treated, coated or contain fillers. The strap may be made from other materials; however it is preferred that any such material is inexpensive, reliable, "food safe" and is environmentally friendly. Certain degradable plastics may be suited. Some laminated materials may be suitable. A woven or non-woven stiff fabric may be suitable.

The strap may be pre-cut from a stencil.

The strap can be easily assembled and placed around small, medium or large sized boxes such as pizza or cake to enable the consumer to carry the boxes using one hand. The strap can allow consumers to carry more than one box at a time as well as additional items such as bottles of soft drink with one hand.

In addition, use of the strap prevents the consumer from carrying boxes containing hot items in their hands.

The length of the first strap portion and a second strap portion may vary depending on the size and shape of the boxed food item to be carried. It is envisaged that the length of the first strap portion and a second strap portion will be between 60-100 cm. It is also preferred that the first portion and the second strap portion are of the same length or approximately the same length.

The width of each strap portion may vary depending on the type of material from which the carry handle is made. For instance, a wider strap portion may be able to securely hold a larger weight using cheaper materials. It is envisaged that the strap portion will typically have a width of between 2-5 cm.

For ease of manufacture, it is envisaged that each strap portion will be substantially rectangular when viewed in plan. However, there may be circumstances where there is an advantage in providing different shapes. For instance, each strap portion may include some form of edge profile to assist in connecting the edges together to form the carry handle.

The, or each, strap portion may be reinforced if desired. For instance, the strap portion may include reinforcing filaments or some form of reinforcing grid or mat type arrangement. It is also envisaged that the, or each, strap portion may include certain areas or zones that are stronger or thicker or reinforced.

It is envisaged that the carry handle will be made of the same material. However, there may be circumstances where part of the carry handle (for instance part or all of one or both strap portions) are made of dissimilar materials to provide strength and durability. For instance, part of the strap portion may be made of water resistant material such that the carry handle does not fail should part of the carry handle to become damp (for instance liquid oozing from the food product or condensation from the drink bottle).

The strap member may contain advertising material printed or otherwise applied to the strap member.

The first strap portion and the second strap portion are connected by the first fold line. However, it is preferred that the portions are further initially attached together by a frangible portion or portions. These may comprise serrations, tear lines, tear off tabs, lines of weakness, or other means to enable the portions to be initially held together by more than the first fold line, but relatively easily separated (bar the fold line) to enable the portions to be twisted and folded to the "use" position. The initial additional temporary attachment can make the carry handle more sturdy and robust when in the initial non-use position, so that multiple such handles can be stacked together with little likelihood of separate handles becoming entangled together.

The point is suitably approximately midway across the strap portion. The diagonal angle is suitably an obtuse angle of about 135°. The fold line may be an imaginary line. Alternatively, the fold line may comprise a visible line to facilitate correct folding about the fold line. The fold line may also comprise a small groove or other profile to facilitate folding about the fold line.

The fold line is preferably located about midway between the opposed end edges of the strap member. An advantage of this location is that when the handle is in the "use" position (see, for instance FIG. 7), the handle is "balanced" as the strap portions intersect each other at about the midway portion. If the fold line was towards one end edge, the strap portions will intersect away from the midway point which may unbalance the carry handle. However, for small pizza boxes, the precise location of the fold handle may not need to be exact.

The strap portions are generally parallel to each other in the initial non-use portion. The portions are also suitably in a side by side relationship as illustrated at least in FIGS. 1 and 5. This arrangement allows carry handles to be more easily stacked together in a box or other dispenser prior to use.

The strap portions are suitably sufficiently stiff to be more easily stacked together in a box or other dispenser prior to use and easily removed from the box.

In the carrying position, the strap portions are suitably folded or moved to a position substantially at right angles to each other, such that, in plan, the straps resemble a cross.

The first fold line suitably communicates with a first cut line to facilitate the folding action. The cut line suitably extends from adjacent a longitudinal edge of the strap portion and to the end of the fold line to form a V configuration when viewed in plan.

One of the strap portions suitably comprises an interconnection means to enable end regions of the strap member to be interconnected. The interconnection means may comprise open ended cutouts. Each end region of the strap member may have one or more of such cutouts to connect the ends together. FIG. 5 and FIG. 7 at least illustrate non-limiting cutouts 21, 22.

The other strap portion suitable comprises an opening to enable the first strap portion to pass through the opening. A pair of openings may be provided. The openings may comprise slots which are suitably aligned when ends of the strap are overlapped. FIG. 5 and FIG. 7 at least illustrate non-limiting slots 19, 20.

One of the strap portions may comprise additional fold lines to facilitate folding of the strap portion about an upper edge of a food box being carried. FIG. 8 and FIG. 11 at least illustrate non-limiting examples of such additional fold lines 30, 31.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
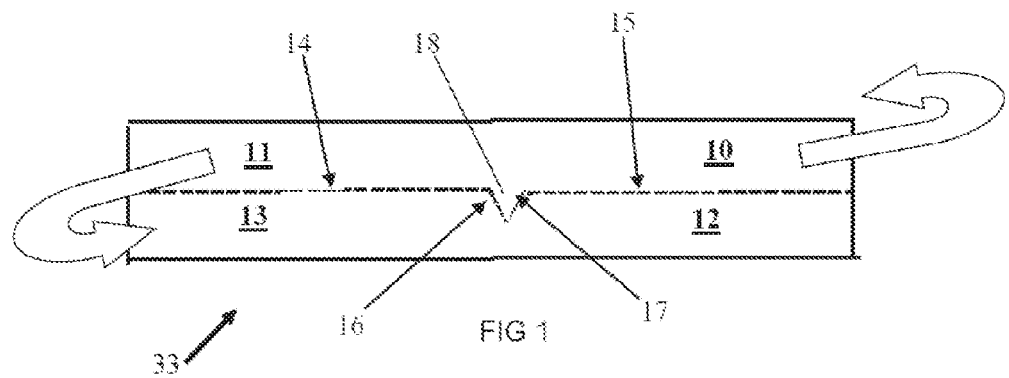
FIG. 1. Illustrates schematically a carry handle for a boxed food item and in the initial non-use position.
Figure 5:
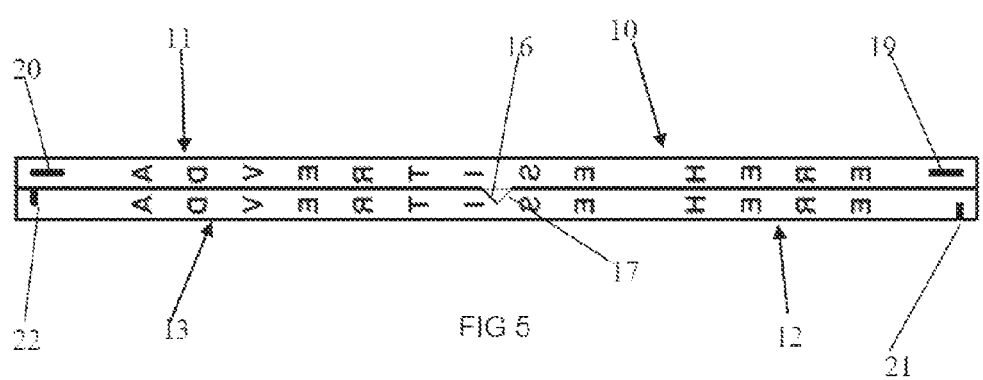
FIG. 5. Illustrates a carry handle for a boxed food item and in the initial non-use position.

Referring initially to FIG. 1 and FIG. 5, there is illustrated a carry handle 33 for a boxed food item 24, the handle comprising an elongate strap having:

a first strap portion 10/11;

a second strap portion 12/13;

a first fold line 17 attaching the strap portions together;

wherein the strap portions are foldable about the first fold line between a non-use position where the strap portions are generally parallel to each other and a carrying position where the strap portions are angled to each other.

The carry handle as illustrated in FIGS. 5-12 more accurately illustrates the commercial product, while the carry handle as illustrated in FIGS. 1-4 is schematic and is used to better illustrate the folding steps.

Referring to FIG. 1, the carry handle 33 is made of a disposable relatively stiff paper or cardboard. Specifically, the carry handle 33 comprises an elongate strap like member which has a first strap portion and a second strap portion which are connected together. To better illustrate and understand the folding sequence of the carry handle from the flat non-use position of FIG. 1 (and FIG. 5) to the use position illustrated at least in FIG. 7, the various parts of the strap portions are given different reference numerals. Therefore, and referring at least to FIG. 1, the first strap portion is given reference numeral 10 for one half of the first strap portion, reference numeral 11 for the other half of the first strap portion. The other side (face) of the first strap is given reference numerals 10A and 11A as illustrated at least in FIG. 2, and part 10A is directly behind 10 and 11A is behind 11. Similarly, the second strap portion has a front face with reference numeral 12 on one half of the front face and reference numeral 13 on the other half of the front face, and also has reference numerals 12A and 13A on the other face of the strap.

FIG. 1 also illustrates the first fold line 17 and a cut line 16.

Strap portions 10/11 and 12/13 are connected together at least by fold line 17. However, initially, the portions may also be temporally connected along cut lines 14 and 15, for instance by frangible portions, so that the initial stiff planar configuration of FIG. 1 is maintained and the strap portions do not begin to sag relative to each other.

The carry handle 33 can be mass produced from inexpensive paper or cardboard and used by the pizza or food outlet.

When required, a carry handle 33 can be removed from a box or dispenser. Next, any temporary connections between the strap portions can be broken. This can be done by folding strap portion 10/11 onto a L shape relative to strap portion 12/13.

Figure 2:
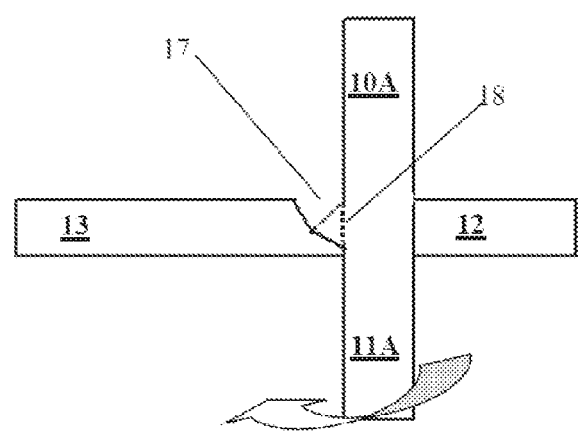
FIG. 2. Illustrates the first step of converting the handle of FIG. 1 into the carrying "use" position by folding one strap portion at right angles over the other strap portions about a first fold line.

Next, a person holds "second" strap portion 12/13 and twists "first" strap portion 10/11 about fold line 17 by about 90° such that portion 11 rotates above the plane and portion 10 rotates below the plane. Then the "first" strap portion is folded against the second strap portion as illustrated in FIG. 2. In this figure the rear face of the first strap portion is uppermost and therefore has reference numerals 10A and 11A.

Figure 3:
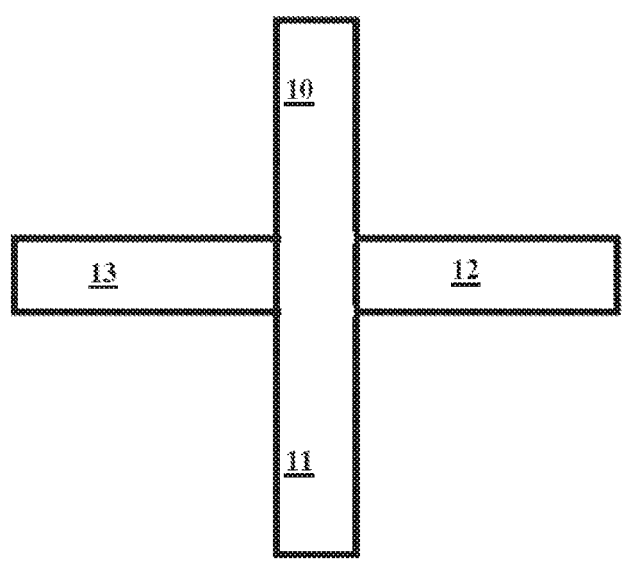
FIG. 3. Illustrates a further step where the folded over strap portion is folded over itself to be midway across the first strap portion.

Finally, and as illustrated from FIG. 2 to FIG. 3, the first strap portion is folder by 180° about fold line 18 to again have the front face visible 10/11. The first strap portion also is positioned midway along the (lower) second strap member.

Although the above describes and illustrates a separate multistep process, in most cases the twisting about fold line 17 and folding about fold line 18 will happen simultaneously in a single smooth sequence.

Figure 4:
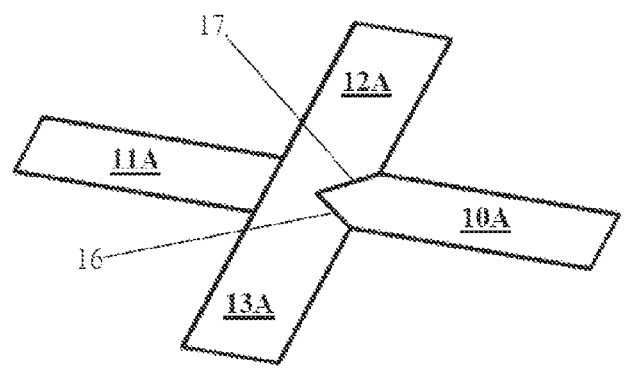
FIG. 4. Illustrates the underside of the strap of FIG. 3.

FIG. 4 illustrates the underneath view of FIG. 3.

Figure 6:
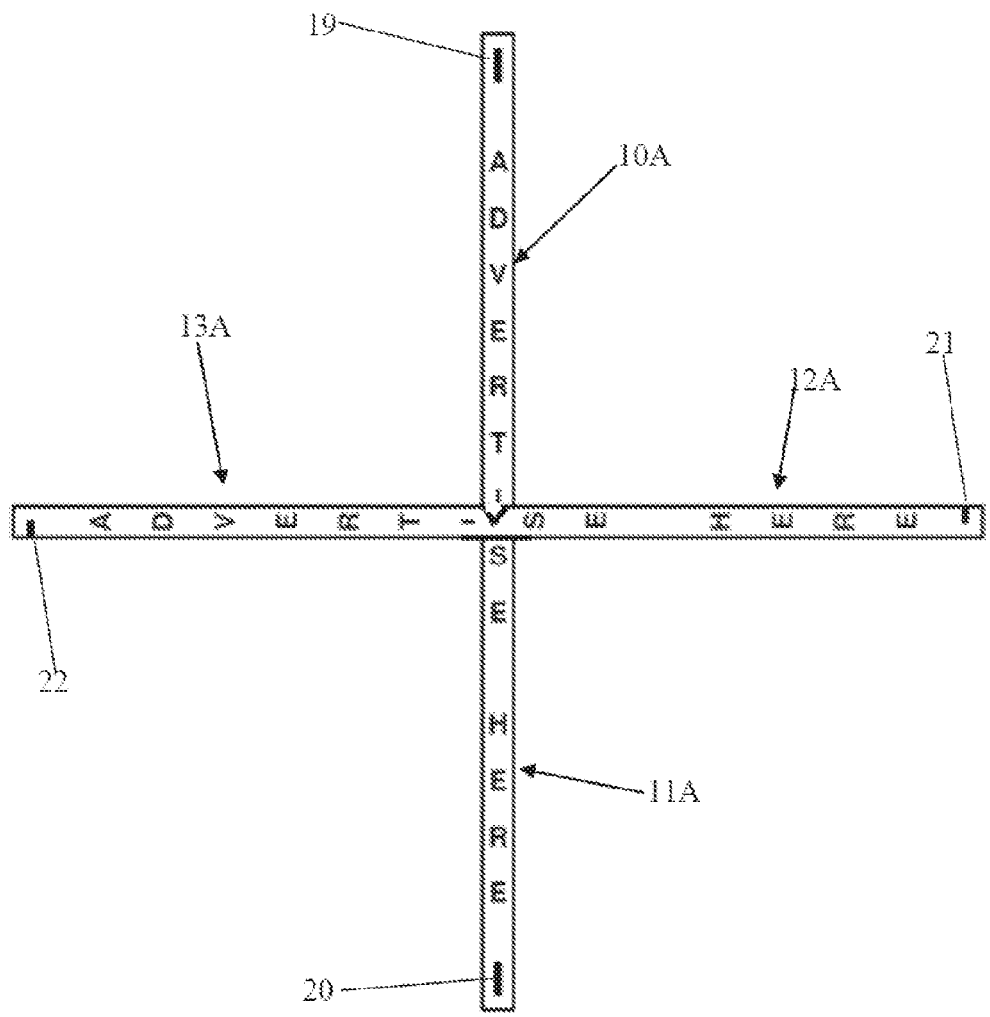
FIG. 6. Illustrates the handle of FIG. 5 in the folded over position.

FIGS. 5 and 6 illustrate the same process as described above.

FIGS. 5 and 6 illustrate further features of the carry handle. Specifically, FIGS. 5 and 6 illustrate that one of the strap portions (for instance 10-11) containing slots 19, 20 adjacent each longitudinal end of the strap portion, and the other of the strap portions (for instance 12-13) contain cutouts 21, 22. These slots 19, 20 and cutouts 21, 22 assist in holding the various strap portions into the final shape of the carry handle and this will be described hereinafter.

Figure 7:
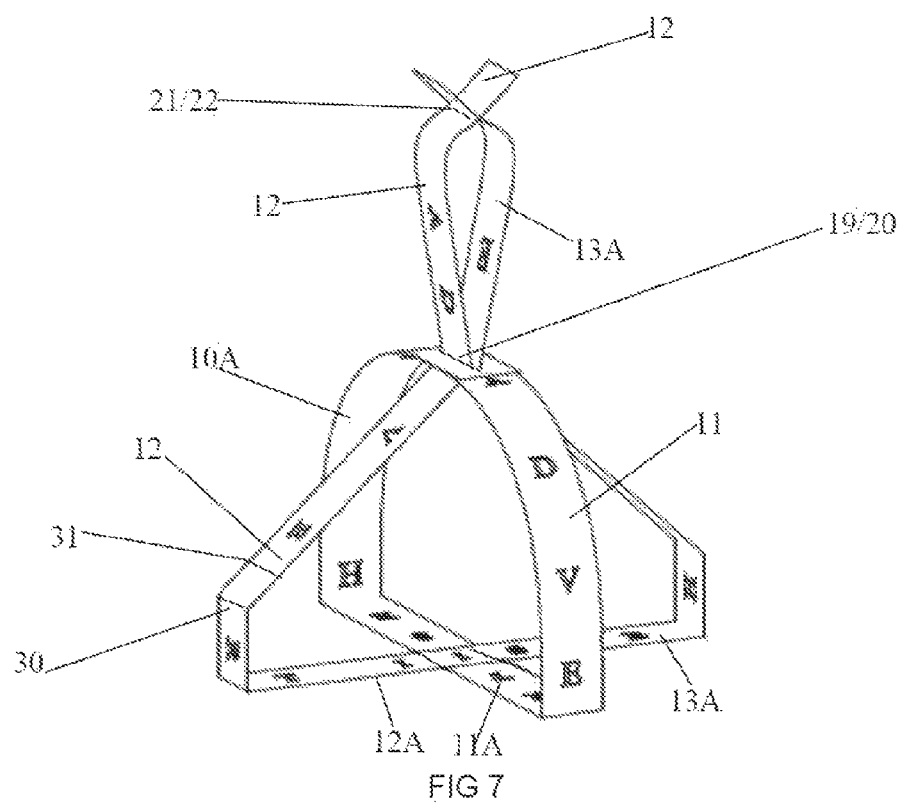
FIGS. 7-9. Illustrate an assembled handle, the handle with a pizza box, and the handle with a pizza box and drink bottles.

Referring now to FIG. 7, the strap portions as illustrated in FIG. 6 (being substantially at right angles to each other) can now be further folded to the arrangement illustrated in FIG. 7. Specifically, strap portion 10-11 is folded upwardly and looped together such that the slots 19, 20 overlie each other and the slots are aligned. It is envisaged that some form of press stick adhesive may be provided to assist in holding strap portion in the loop configuration illustrated in FIG. 7. The adhesive may be protected by a peel off cover layer.

Once the slots 19, 20 are aligned, the other strap portion 12-13 can also be looped upward with each opposed end being pressed together and pushed through the aligned slots 19, 20. Once this occurs, the pushed through end parts of strap portion 12-13 can be connected together by engaging cutout 21 with cutout 22.

Figure 8:
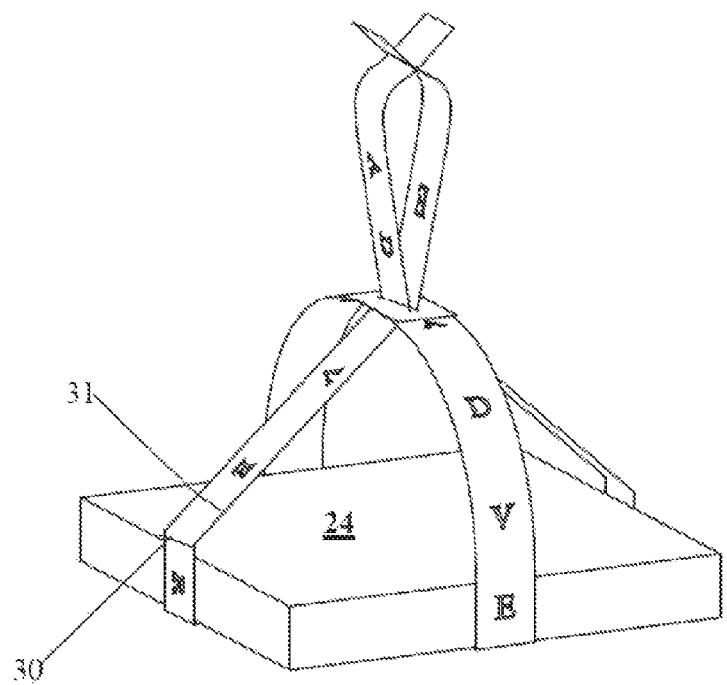

The carry handle is now in the use position and can hold a pizza box 24 (see FIG. 8). The person can then grip the "handle" portion 27 of the carry handle in a convenient manner especially because of the inter-engagement of the end of strap portion 12-13 via a connection of the cutouts 21, 22.

The pizza box 24 is firmly supported on its base by both straps being at right angles to each other. Furthermore, the top of the box can still be opened to inspect the pizza.

The strap can be quite easily removed typically by tearing the strap away from the box, or with slightly more patience, by pushing the "handle" portion 27 back through the aligned openings 19, 20.

Figure 11:
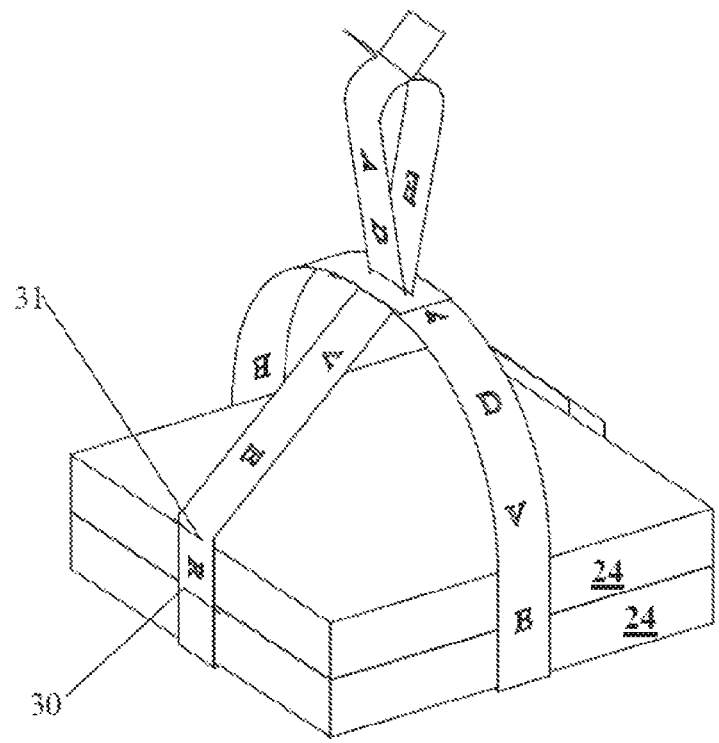

Strap portion 12, 13 can be provided with additional fold lines 30, 31 (see for instance FIG. 7, FIG. 8 and FIG. 11). The fold lines can be positioned to approximate the height of a pizza box to enable better gripping of the sides of the pizza box. Fold line 31 is a fold line should two pizza boxes (see FIG. 11) need to be held by the carry handle.

Figure 9:
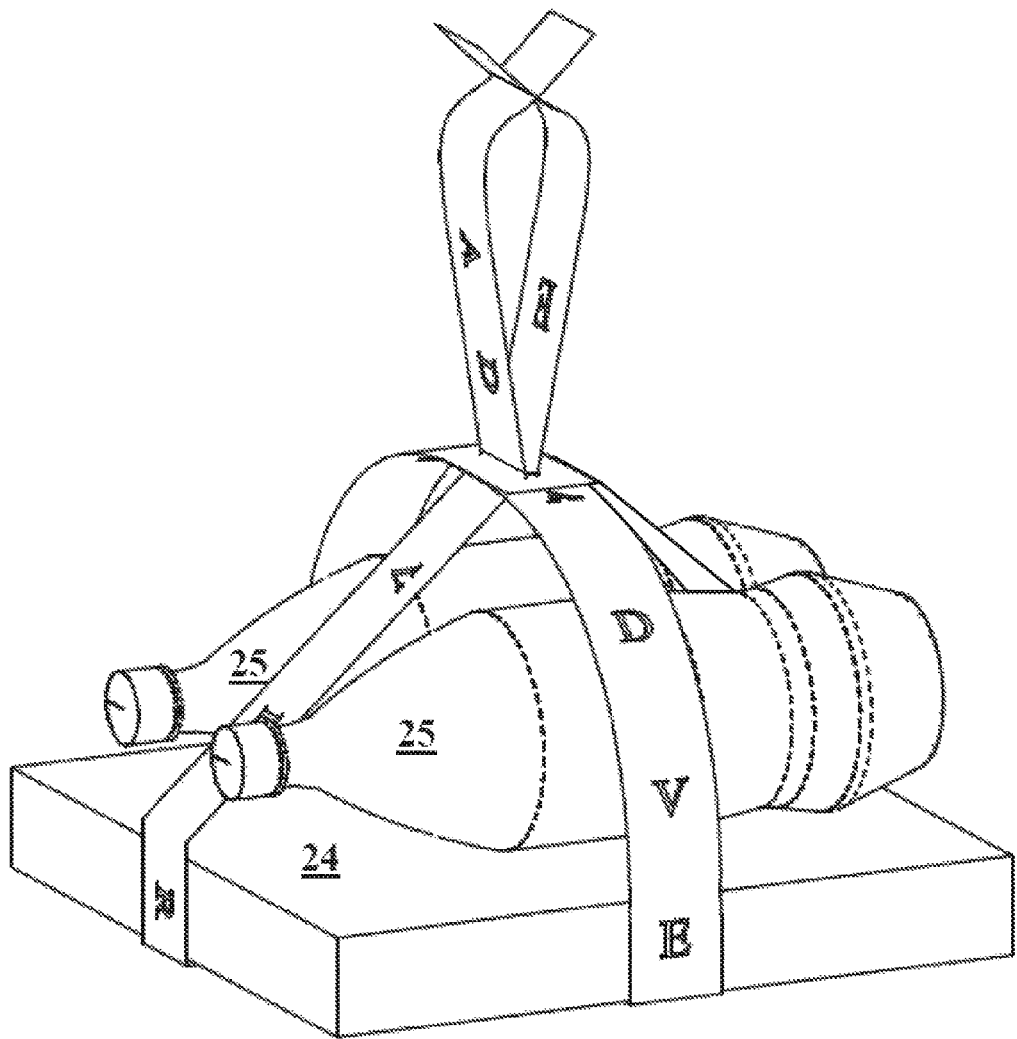
Figure 10:
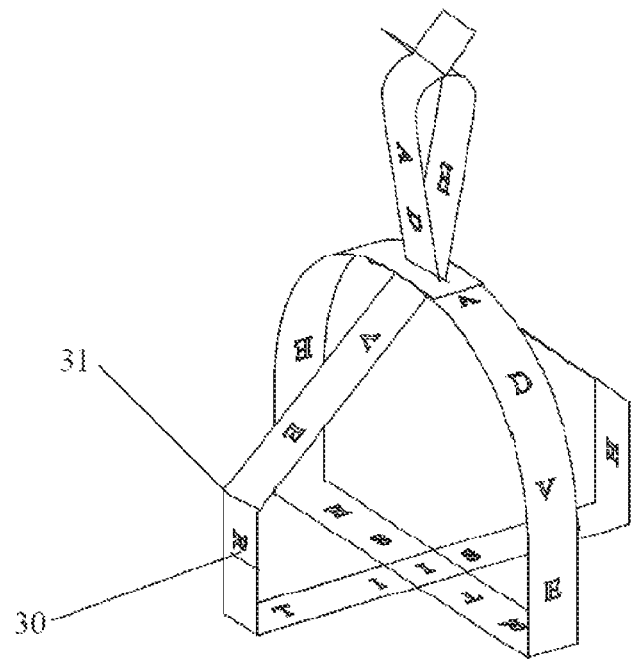
FIGS. 10-12. Illustrate the same handle of FIGS. 7-9 but now carrying two pizza boxes and two pizza boxes with drink bottles.
Figure 12:
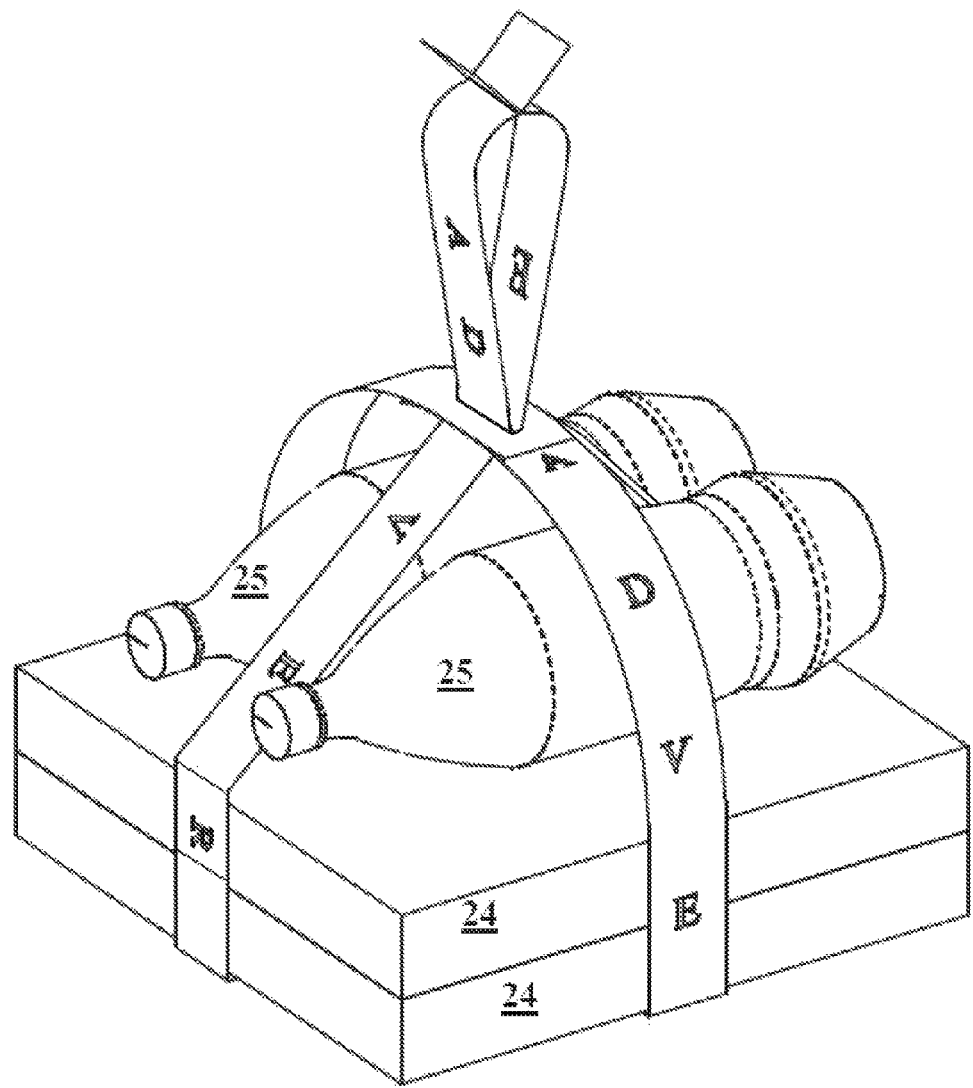

Another advantage of the carry handle is illustrated in FIG. 9 and FIG. 12. Drink bottles 25 can be laid on top of pizza box 24 and can be at least partially supported by the carry handle. The strap portions of the carry handle will at least prevent the drink bottles rolling off each side edge of the pizza box.

Other additional purchases (such as garlic bread) can also be placed on the pizza box and the entire purchase can be carried with one hand in a safe manner with little or no likelihood of contact with the hot pizza box or inadvertent dropping of the pizza box or drink bottles.

This can reduce possible liability against the pizza outlets.

The other hand of the person carrying the pizza box/drink bottles etc. is free and can hold car keys, a mobile phone, a child hand and the like.

The inexpensive nature of the carry handle will make it acceptable to pizza outlets.

Advertising can be printed or otherwise applied to the various parts of the carry handle.

The strap is assembled by the vendor based on the pre-cut stencil and folded along the embedded fold lines and placed around the boxes to enable to customer to carry the boxes securely in one hand. The four sides of the strap encase the box and are secured by interlocking the looped handle at the top for ease of transporting boxes with one hand.

It is intended that vendors would have the option of placing advertising or printing menus or specials on the strap if desired.

USE FOR THE INVENTION

The above description and illustrations demonstrate how the invention may be used as a disposable inexpensive carry handle for hot pizza boxes, additional drink containers, and also for other box food items that may be difficult to carry such as large (and possibly fragile) cakes and the like.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

I claim:

1. A carry handle for a boxed food item, the handle comprising an elongate strap having:
    a first strap portion;
    a second strap portion;
    a first fold line attaching the strap portions together the first fold line being entirely on one of the strap portions and extending from one longitudinal edge of the strap portion and diagonally to a point spaced inwardly from the other longitudinal edge of the strap portion;
    wherein the strap portions are foldable about the first fold line between a non-use position where the strap portions are generally parallel to each other and a carrying position where the strap portions are angled to each other.

2. The handle of claim 1, wherein the handle is made of disposable paper or cardboard.

3. The handle of claim 1, wherein the strap portions adjacent the first fold line are at right angles relative to each other in the carrying position.

4. The handle of claim 1, wherein one said strap portion contains slots adjacent opposed end edges thereof, the slots being aligned when said opposed end edges are overlapped.

5. The handle of claim 1, wherein one strap portion contains cutouts adjacent opposed edges thereof and adapted to interconnect with each other to join the opposed edges together.

6. The handle of claim 4, wherein the ends of one strap portion are adapted to pass through the aligned slots of the other strap portion.

7. The handle of claim 1, wherein the point is approximately midway across the strap portion.

8. The handle of claim 1, wherein the first fold line extends from the one longitudinal edge of the strap portion diagonally to the point spaced inwardly from the other longitudinal edge of the strap portion at an obtuse angle of 135°.

9. The handle of claim 1, wherein the fold line is located about midway between the opposed end edges of the strap member.

10. The handle of claim 1, wherein the first fold line communicates with a first cut line to facilitate the folding action, the cut line extending from adjacent a longitudinal edge of the strap portion and to the end of the fold line to together form a V configuration when viewed in plan.

11. The handle of claim 1, including a food product in a box supported by the handle, part of the first strap portion and part of the second strap portion passing underneath the box.

12. A method for carrying a boxed food product comprising:
    providing a handle as claimed in claim 1;
    folding the first strap portion and the second strap portion about the fold line to provide a cross shaped configuration when viewed in plan;
    positioning a boxed food product on the cross shaped handle;
    lifting the ends of one said strap portion to overlap each other over the box, the said ends having slots that align with each other;
    lifting the ends of the other said strap portion;
    pushing the ends through the aligned slots, and interconnecting cutouts in each end of the pushed through ends to form a loop, thereby enabling the base of the boxed food product to be supported and the boxed food product to be carried by one hand.

* * * * *